(12) United States Patent
Reger

(10) Patent No.: US 11,975,232 B2
(45) Date of Patent: May 7, 2024

(54) FIRE SUPPRESSION COMPOSITIONS AND METHOD OF MANUFACTURE FOR SUPPRESSION AND PREVENTION OF FIRE

(71) Applicant: Michael L. Reger, Boca Raton, FL (US)

(72) Inventor: Michael L. Reger, Boca Raton, FL (US)

( * ) Notice: Subject to any disclaimer, the term of this patent is extended or adjusted under 35 U.S.C. 154(b) by 126 days.

(21) Appl. No.: 17/199,437

(22) Filed: Mar. 11, 2021

(65) Prior Publication Data

US 2021/0283448 A1      Sep. 16, 2021

Related U.S. Application Data

(60) Provisional application No. 62/987,906, filed on Mar. 11, 2020.

(51) Int. Cl.
*A62D 1/00* (2006.01)
*C08J 3/075* (2006.01)

(52) U.S. Cl.
CPC ............ *A62D 1/0064* (2013.01); *C08J 3/075* (2013.01); *C08J 2333/02* (2013.01); *C08J 2433/26* (2013.01)

(58) Field of Classification Search
None
See application file for complete search history.

(56) References Cited

FOREIGN PATENT DOCUMENTS

| CN | 106039625 A | * | 10/2016 | ............. A62C 31/00 |
| EP | 3279239 A1 | * | 2/2018 | ......... B01D 17/0202 |
| WO | WO-2015134856 A1 | * | 9/2015 | ........... A62D 1/0064 |

* cited by examiner

*Primary Examiner* — Tanisha Diggs
(74) *Attorney, Agent, or Firm* — Withers Bergman LLP

(57) ABSTRACT

A composition and method of manufacture of Sodium Polyacrylate cross linked polymer containing compounds are described in the various embodiments below. The composition may form a gel like substance. The composition may exhibit beneficial properties to the suppression, or prevention, of a fire, such as adherence to surfaces, thereby smothering a fire, cooling the fuel of the fire, or cooling the potential fuel of a fire, thereby preventing the fire from initiating.

5 Claims, 2 Drawing Sheets

FIRE SUPPRESSION COMPOSITIONS AND METHOD OF MANUFACTURE FOR SUPPRESSION AND PREVENTION OF FIRE

This application claims the benefit of U.S. Provisional Application No. 62/987,906, filed Mar. 11, 2020, the entirety of which is incorporated herein by reference.

FIELD OF THE INVENTION

The present invention relates to fire suppression compositions and the method of manufacturing.

The combinations and compositions provided by the present invention may be used in the suppression and/or prevention of fire caused by overheating or ignition by other means.

BACKGROUND OF THE INVENTION

Sodium Polyacrylate (CAS #9003-04-7) has a chemical formula of $(C_3H_3NaO_2)_n$.

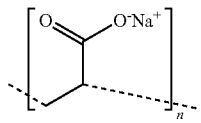

It was developed by the Department of Agriculture to provide improved absorption properties over prior materials. However, the traditional manufacturing process of the polymer limited its physical characteristics, when hydrated, specifically as it relates to fire suppression and prevention.

Prior attempts to improve the physical characteristics of the polymer meet without success. For example, mineral oil and vegetable oil were added to the polymer to form a gel. This gel produced toxic substances as well as resulting in a hardened resin which ruined equipment.

To overcome the problems associated with prior attempts to use Sodium Polyacrylate in the suppression of fire, applicants have improved the adhesion properties necessary for suppression, wherein the fuel of the fire is coated and cooled thereby smothering the fire, extinguishing any flame; and/or preventing further incident of heat buildup, or prevent heat buildup beyond a chosen threshold thereby preventing ignition of a flame, or burning in other forms. The effective and rapid suppression and/or prevention of fire has immediate financial benefits, both in recovery of otherwise lost equipment, and post incident cleanup.

SUMMARY OF THE INVENTION

In an embodiment of the invention, a method for making a fire suppression composition is provided comprising: (a) obtaining sodium polyacrylate polymer; (b) screening said sodium polyacrylate to obtain a plurality of first particle sizes of less than or equal to 300 microns and greater than 150 microns; and (c) combining said plurality of second particle sizes with water to form said fire suppressant composition. The composition of the embodiment may be intended for immediate or near immediate use to suppress a fire. Alternatively the method may further comprise screening said sodium polyacrylate to obtain a plurality of second particle sizes of 150 microns or less; obtaining a first sample of said plurality of second particle sizes; performing a first test of said first sample for water retention, and homogeneity; and combining said plurality of second particle sizes with said water to form a second fire suppressant composition if said first sample passes said first test.

An alternative composition embodiment may further comprise screening said plurality of second particle sizes failing said first test into quartiles of micron sizes; obtaining a second sample of said quartiles of micron sizes; performing a second test of said second sample for water retention, and homogeneity; and combining said quartile of micron sizes with said water to form a third suppressant composition if said second test is successful.

An alternative composition embodiment may further comprise combining said quartiles of micron sizes with polyacrylamide to form an intermediate composition, if said second test of said quartiles of micron sizes fails; obtaining a third sample of said intermediate composition; performing a third test of said third sample for water retention, and homogeneity; and combining said intermediate composition with said water to form a forth suppressant composition if said third test is successful.

The composition of an embodiment may be intended for long term storage before use, such as in a fire extinguisher.

An alternative composition embodiment may further comprise combining said intermediate composition, and water with a surfactant to form a fifth suppressant composition. An embodiment of the composition may comprises properties to migrate into small spaces. An embodiment of fire suppression/prevention composition may comprise properties to adhere to surfaces. In one embodiment the polyacrylamide is combined with sodium polyacrylate and the water in the range of about 0% to about 20% by weight.

The invention therefore provides for a composition and method of manufacture of fire suppressant having

BRIEF DESCRIPTION OF THE DRAWINGS

The following drawings form part of the present specification and are included to further demonstrate certain aspects of the examples disclosed herein. The invention may be better understood by reference to one or more of these drawings in combination with the detailed description of specific embodiments presented herein.

DETAILED DESCRIPTION OF THE INVENTION

Figure 1:
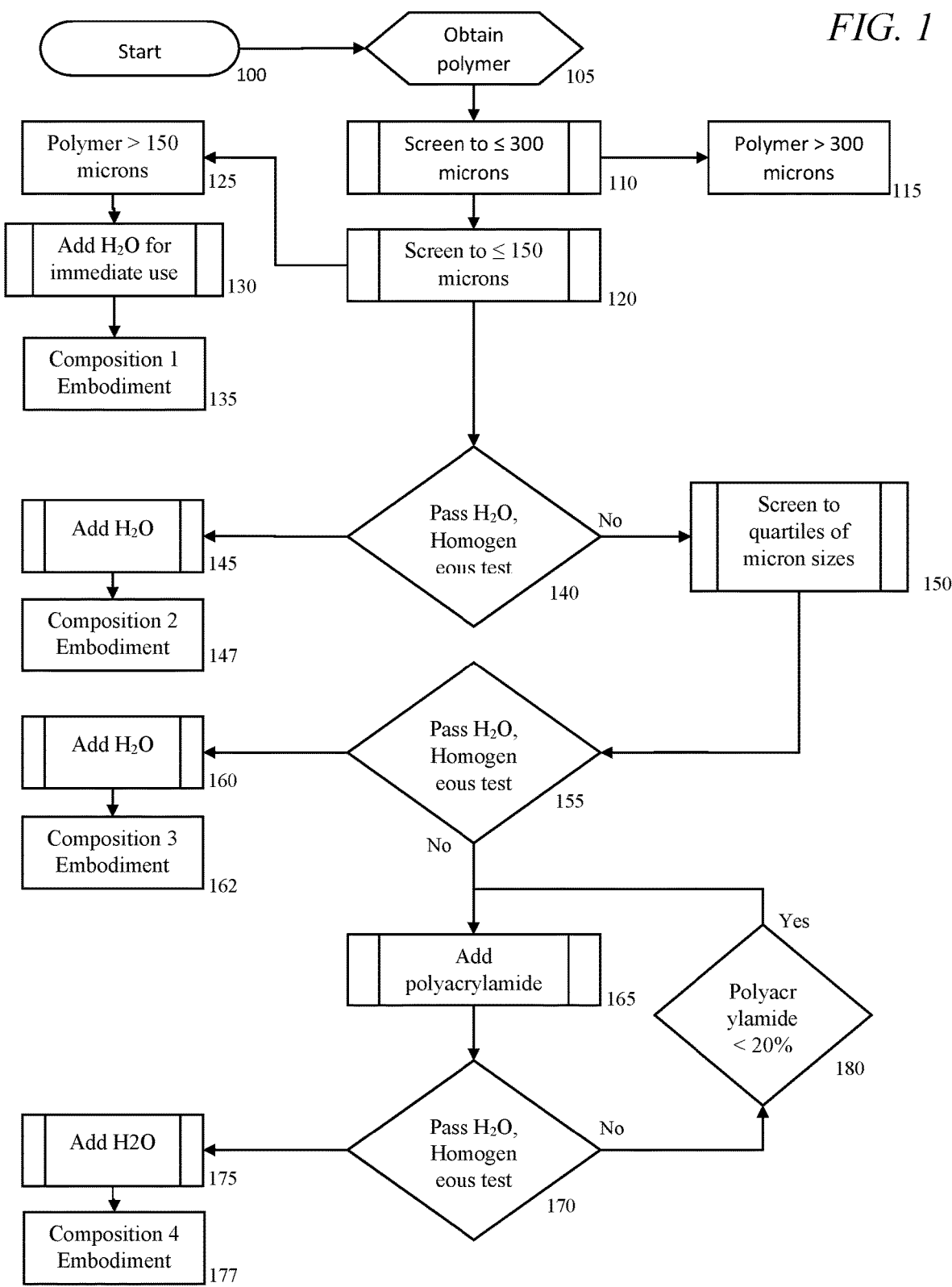
FIG. 1 depicts a flowchart representing embodiments of methods of combining Sodium Polyacrylate with other compounds to form fire suppression/prevention compositions therefrom.

Described herein are methods useful modifying physical characteristics of Sodium Polyacrylate containing compounds. The resulting compositions provide fire suppressant agents to suppress or prevent fire.

The present invention is based on the unexpected discovery that by improving the physical properties of a composition containing Sodium Polyacrylate, a significantly improved suppression of fire can be achieved. In another aspect, the improved composition containing Sodium Polyacrylate can be applied to objects or environments and released prior to ignition thereby preventing the initiation of fire and the resulting damage. In another aspect, the composition is environmentally inert and easy to clean up during a post incident phase.

Sodium Polyacrylate Cross Linked

The composition and method of manufacture of Sodium Polyacrylate cross linked polymer containing compounds are described in the various embodiments below. The composition may form a gel like substance. The composition may exhibit beneficial properties to the suppression, or prevention, of a fire, such as adherence to surfaces, thereby smothering a fire, cooling the fuel of the fire, or cooling the potential fuel of a fire, thereby preventing the fire from initiating.

Example 1

In one embodiment, a composition of bulk Sodium Polyacrylate polymer composed of 300 microns or smaller particles hydrated by the addition of water may be used in the suppression of fire, or provided for the prevention of fire. Particles greater than 300 microns in size are discarded. For immediate use, the polymer is batched mixed. Batch mixing of the particles immediately prior to use ensures even distribution of particle sizes within the batch and in the suppression composition by reduction of settling of smaller particles prior to combining with water to form the composition. Immediately after, or during, mixing, such as to maintain the distribution of particle size, the polymer is added to water, the ratio of which is determined by factors such as water type and intended purpose. For example, in one embodiment the ratio of Sodium Polyacrylate polymer is relatively low to achieve a composition of low viscosity as might be used in dissemination by aircraft. In an alternative embodiment, the ratio of Sodium Polyacrylate polymer to water is high to obtain a composition of high viscosity as might be used for structure protection. The mixing of polymer and water may occur at the time of suppression, such as via inline eduction into a fire hose or similar discharge device.

The composition of Example 1 may provide suppression on surfaces of varying texture, whereby larger particles remain on the surface, while smaller particles fill void that otherwise might not be address by a composition of singularly large particles. The limitation of the embodiments described above under Example 1 are based on the need to keep the distribution of particle sizes maintained. To overcome the requirement for immediate pre-mixing or mixing contemporaneously during the combining process the below embodiments of Example 2 is described.

Example 2

In an alternative embodiment, a fire suppression composition of Sodium Polyacrylate cross-linked polymer composed of 150 micron particles may manufactured for use in the suppression of fire or provided for the prevention of fire. The composition is manufactured by screening bulk Sodium Polyacrylate polymer to accumulate particles of 150 micron or less. The screening process may occur multiple times. The polymer is then combined with water by hydration of the 150 micron sized particles at a ratio consistent with proposed use. For example, as shown previously, a high ratio of polymer to water produces a composition of high viscosity, and a low ratio of polymer to water produces a composition of low viscosity.

To arrive at predetermined levels of hydration, suspension and homogeneity of the composition, the samples of the composition are tested. Predetermined levels of hydration, suspension, and homogeneity may be based on intended use, or an algorithm. If such testing concludes the composition fails, the composition may be further subjected to the processing as disclosed in Example 3 below. As such, the composition as described below for Example three, may begin with the composition of Example 2 instead of starting with bulk polymer as described. The composition may be stored long term with minimal separation. Use of such composition is suitable for extinguishers or a fire suppressant system tank, such as might be used in lithium ion battery systems. Periodic testing, as is standard practice with extinguishers and related systems ensures the product stability.

The limitation of the embodiments described above under Example 2 are based on the need to ensure hydration of the polymer particles is maintained during long-term storage, such as with a fire extinguisher and the related periodic testing. To overcome the limitations as described and requirement for periodic testing, the below embodiments of Example 3 are put forth.

Example 3

In an alternative embodiment a composition containing Sodium Polyacrylate cross-linked polymer in more defined and restrictive sizes may be used. Bulk polymer is screened to achieve a combination of sizes with a relatively even distribution per quartile (for example: 0-37, 38-75, 76-112, 112-150 approximate). Screening may occur multiple times and for each quartile. The polymer quartiles are then combined with water by hydration of the quartile sized particles at a ratio consistent with proposed use. For example, as shown previously, a high ratio of polymer to water produces a composition of high viscosity, and a low ratio of polymer to water produces a composition of low viscosity. Each quartile of polymer may alternatively require different hydration levels.

Each of the above quartile ranges may vary. Thus, levels of hydration may vary dependent upon the maximum size particle in a quartile, the average size particle in a quartile, or depend on an algorithm.

Alternatively, the composition that failed hydration, suspension and homogeneity testing, as described above for Example 2, may be used as the starting substance in place of starting with bulk polymer as described herein above for Example 3.

With screening into quartiles a relatively even distribution of particle sizes throughout the manufacturing lot can be achieved. To arrive at predetermined levels of hydration, suspension and homogeneity of the compositions, testing is performed on samples of the compositions during manufacture. Predetermined levels of hydration, suspension, and homogeneity may be based on intended use, or an algorithm. Samples are tested for hydration levels, suspension, and homogeneity of the composition. If such testing concludes the composition fails, the composition may be further subjected to the processing as disclosed below in Example 4.

Example 4

The composition of Example 3, as described above, is suitable for most uses. Any remaining variations in the manufactured composition may result from variations in the base sodium polyacrylate polymer. Slight variations of the polymer particles may exist and require adjustment of the formulation to stabilize the composition and limit separation. Instability may be determined during hydration, separation and homogeneity testing. Testing of a polymer lot that results in separation of the polymer and water, may be corrected by the addition of a Polyacrylamide. Variation in sodium polyacrylate particles may cause compositions to exhibit initially higher absorption rates. Over time such a composition may exhibit a loss of the absorbed water. Polyacrylamides absorb water at a slower rate compared to sodium polyacrylate polymer. However, once hydrated, the polyacrylamides exhibits an increased ability to retain water when compared to sodium polyacrylate polymer alone. There are a variety of polyacrylamides that can be used.

In one embodiment a composition containing bulk sodium polyacrylate cross-linked polymer in more defined and restrictive sizes is formed by screening the sodium polyacrylate cross-linked polymer to achieve a combination of sizes with a relatively even distribution per quartile (for example: 0-37, 38-75, 76-112, 112-150 approximate). Screening may occur multiple times and for each quartile. The polymer quartiles are then combined with water by hydration of the quartile sized particles and further combined with polyacrylamide to form the composition. The water hydration of the quartile sized particles may occur at a ratio consistent with proposed use. For example, as shown previously, a high ratio of polymer to water produces a composition of high viscosity, and a low ratio of polymer to water produces a composition of low viscosity.

Each quartile of sodium polyacrylate cross-linked polymer may alternatively require different hydration levels, such as described for Example 3. Alternatively, the hydration levels may be adjusted due to the addition of polyacrylamide.

The addition of polyacrylamide to sodium polyacrylate cross-linked polymer and water may occur at a percent weight range of between 0% and 20% of polyacrylamide to the combined sodium polyacrylate cross-linked polymer and water. Alternatively, the addition of polyacrylamide to sodium polyacrylate cross-linked polymer and water may occur at a percent weight range of between 0% and 20% of polyacrylamide to water only.

Use of polyacrylamides has the advantage of a longer shelflife, for example years, such as would be necessary for use in fire extinguishers, and suppression systems where the composition (gel) needs to be in ideal condition in an emergency and often stored over long periods of time.

The above embodiment(s) of Example 4 provide a composition capable of storage for long periods of time. An exemplary use of such composition might be in fire extinguishers or any system requiring ideal condition of the composition over long periods of time while remaining ready and useful in an emergency.

Example 5

Version 5—Addition of Surfactant

Under certain circumstances, due to the surface tension of water, some formulations of suppressant/prevention compositions are not optimized to penetrate below the surface of a structure, such as through cracks, slits and other narrow openings. In a further embodiment a composition of sodium polyacrylate, water and polyacrylamide, as described in Example 4 above, may be combined with a surfactant; thereby improving penetration of the suppression/prevention composition. In one embodiment, the composition comprising sodium polyacrylate, water and polyacrylamide is combined with a coconut-based surfactant. Various coconut surfactants are available for use. Variants have the advantage, in most cases, of being eco-friendly and non-toxic (as is polyacrylate) thereby reducing the post incident hazards and costs associated with clean up.

In one exemplary use of an embodiment, a composition comprising sodium polyacrylate, water, polyacrylamide, and a coconut-based surfactant may be used in the fire suppression and prevention for Lithium Batteries and Bio-fuels. Such a composition exhibits improved penetration into small areas, such as that of battery constructions, since the surfactant, acting as a wetting agent, reduces surface tension of the water allowing migration into smaller spaces that water alone.

FIG. 1 depicts a method of combining sodium polyacrylate, water, and polyacrylamide at various stages to obtain compositions of differing characteristics. The process of combining initiates at the start 100, wherein a batch of bulk sodium polyacrylate polymer is obtained 105 and screened 110 to arrive with particles of 300 microns or less. Those particles greater than 300 microns 115 are discarded or set aside. The particles successfully screened at less than or equal to 300 microns 110 are further screened 120 to less than or equal to 150 microns. Those particles greater than 150 microns and less than 300 microns 125 are hydrated 130 with water for immediate use (or near immediate use) forming Composition 1 135.

Particles successfully screened to less than or equal to 150 microns are tested 140 for water retention and homogeneity, where, if passing, are combined with water 145 thereby forming Composition 2, 147. For particles or batch of particles of sodium polyacrylate, that fail the water retention and homogeneity test 140 are screened 150 to quartile micron sizes and then further tested 155 for water retention and homogeneity. The tests 140, 155 may be performed on a sampling of the batch. Those particles or batch that passes the text 155 are combined 160 with water forming Composition 3, 162. Failing to pass test 155 for water retention and homogeneity, particles or batch of particles are combined with polyacrylamide to form an intermediate composition (not shown). The composition, a batch of the composition or a sampling is tested 170 for water retention and homogeneity. If failing the test 170 additional polyacrylamide may be added 165 if the amount does not exceed 20% 180. The intermediate composition, if meeting the water retention and homogeneity test 170 requirements is combined with water forming Composition 4, 177.

Figure 2:
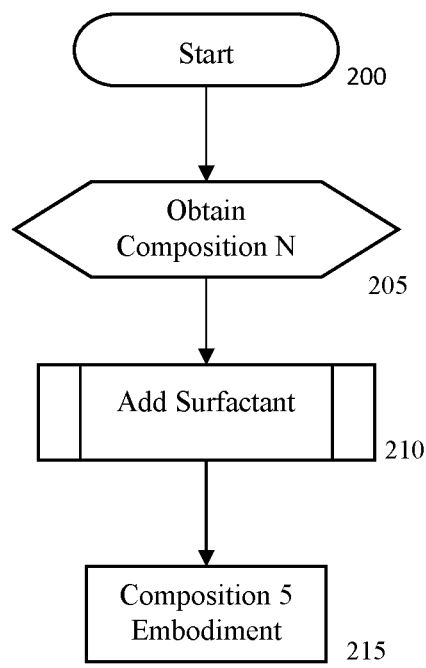
FIG. 2 depicts a flowchart representing an embodiment of methods of combining fire suppressant/prevention compositions with surfactant to form fire suppressant/prevention compositions of lower surface tension.

FIG. 2 depicts a process for addition of surfactant to a composition. Starting at 200 a composition is obtained 205, to which a surfactant is added 210 forming a composition 5, 215.

Unless otherwise indicated, all numbers expressing quantities of ingredients, properties such as weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth are reported as precisely as possible. Any numerical value, however, inherently contains certain errors necessarily resulting from the standard deviation found in their respective testing measurements if performed.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, any reference(s) made to patents and printed publications within this specification are herein individually incorporated by reference in their entirety.

Further, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method for making a fire suppressant composition, the method comprising:
   (a) obtaining sodium polyacrylate polymer;
   (b) screening said sodium polyacrylate polymer to obtain a plurality of particles having diameters of less than or equal to 150 microns;
   (c) dividing said plurality of particles into first, second, third, and fourth quartiles, based on particle diameter wherein:
      said first quartile comprises particles having diameters greater than zero and less than approximately 37 microns;
      said second quartile comprises particles having diameters between approximately 38 and approximately 75 microns;
      said third quartile comprises particles having diameters between approximately 76 and approximately 112 microns, and;
      said fourth quartile comprises particles having diameters between approximately 112 and approximately 150 microns,
   (d) screening each of said quartiles to produce a relatively even particle distribution within each of the quartiles
   (e) combining approximately equal contributions from each of said screened first, second, third, and fourth quartiles having relatively even particle distributions to form a solid mixture;
   (f) hydrating said mixture with water to form a fire suppressant composition of desired viscosity.

2. The method of claim 1, further comprising adding polyacrylamide to said fire suppressant composition at a percent weight range between greater than zero to approximately 20 percent of polyacrylamide to sodium polyacrylate cross-linked polymer and water.

3. The method of claim 2, further comprising adding a surfactant to said fire suppressant composition.

4. The method of claim 2, wherein the surfactant is a coconut-based surfactant.

5. The method of claim 1 wherein further comprising adding polyacrylamide to said fire suppressant composition at a percent weight range between greater than zero to approximately 20 percent of polyacrylamide to water.

* * * * *